(12) United States Patent
Maruyama et al.

(10) Patent No.: US 6,576,892 B2
(45) Date of Patent: Jun. 10, 2003

(54) INFRARED IMAGING DEVICE

(75) Inventors: Tsutomu Maruyama, Kawasaki (JP); Sumihiro Uchida, Kawasaki (JP); Kenichi Murakado, Kawasaki (JP); Hiroshi Kawase, Kawasaki (JP); Eiji Nameki, Kawasaki (JP); Hiroki Shimomae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/059,290

(22) Filed: Jan. 31, 2002

(65) Prior Publication Data

US 2003/0047678 A1 Mar. 13, 2003

(30) Foreign Application Priority Data

Aug. 31, 2001 (JP) ........................................ 2001-264705

(51) Int. Cl.[7] .................................................. G01J 5/02

(52) U.S. Cl. ..................... 250/252.1; 250/330; 250/347

(58) Field of Search ............................... 250/250, 252.1, 250/330, 332, 347, 353

(56) References Cited

U.S. PATENT DOCUMENTS

| | | | | |
|---|---|---|---|---|
| 3,131,307 A | * | 4/1964 | Bock | 250/347 |
| 3,234,380 A | * | 2/1966 | Liston et al. | 250/344 |
| 4,087,691 A | * | 5/1978 | Agerskans et al. | 250/347 |
| 4,280,050 A | * | 7/1981 | Callender et al. | 250/330 |
| 4,783,593 A | * | 11/1988 | Noble | 250/352 |
| 4,940,895 A | * | 7/1990 | Mansfield | 250/332 |
| 5,471,047 A | * | 11/1995 | Even-Sturlesi et al. | 250/208.1 |
| 5,914,489 A | * | 6/1999 | Baliga et al. | 250/339.05 |

FOREIGN PATENT DOCUMENTS

| | | |
|---|---|---|
| JP | 9-93473 | 4/1997 |
| JP | 9-264794 | 10/1997 |
| JP | 9-288828 | 11/1997 |
| JP | 10-142065 | 5/1998 |

* cited by examiner

Primary Examiner—Diego Gutierrez
Assistant Examiner—R. Alexander Smith
(74) Attorney, Agent, or Firm—Staas & Halsey LLP

(57) ABSTRACT

An infrared imaging device includes a board which is movable inside the infrared imaging device, plural kinds of magnification lenses, and plural kinds of infrared light radiation parts which radiate infrared lights having respective radiation temperatures, wherein the lenses and the infrared light radiation parts are situated on the board.

15 Claims, 13 Drawing Sheets

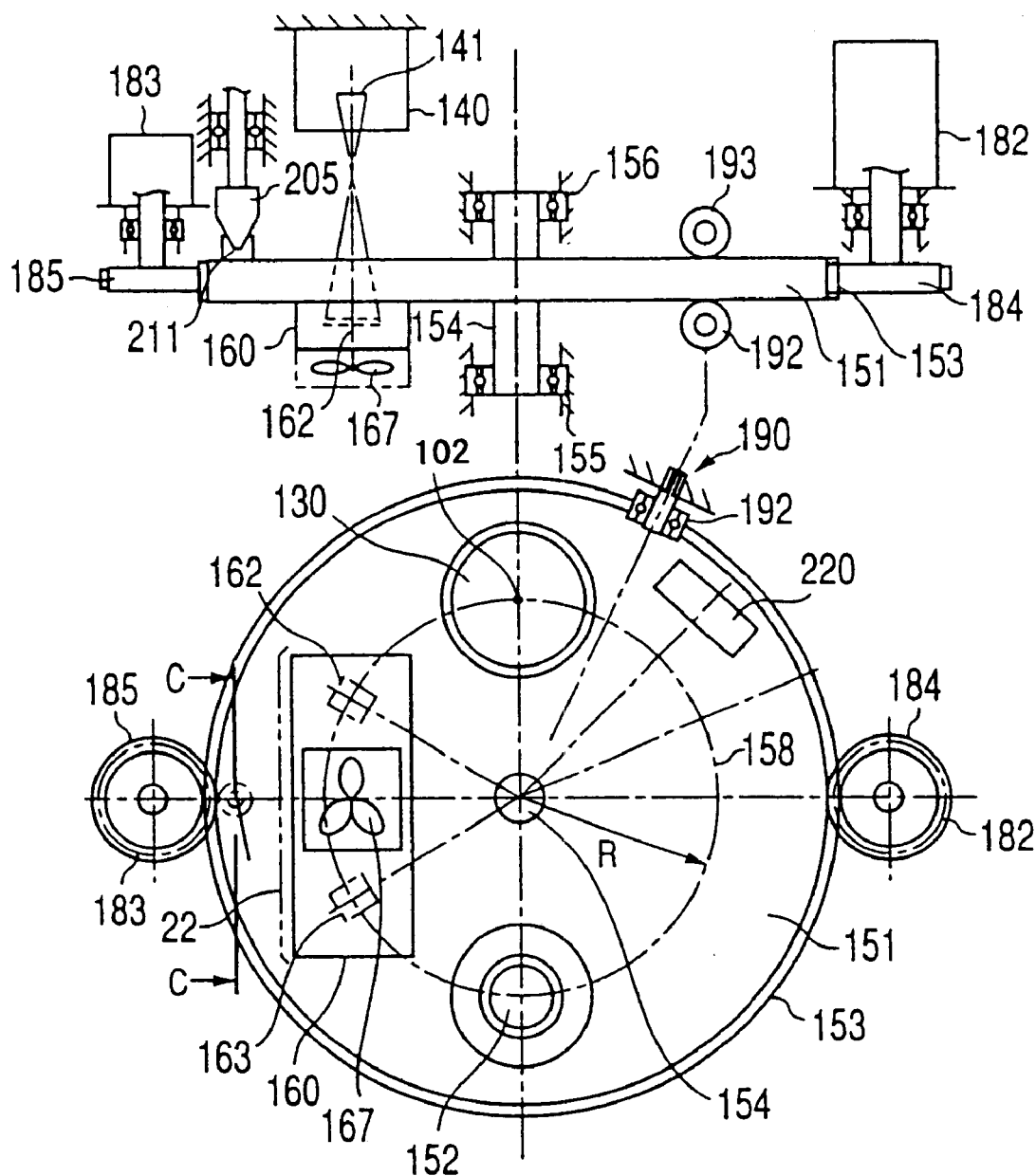

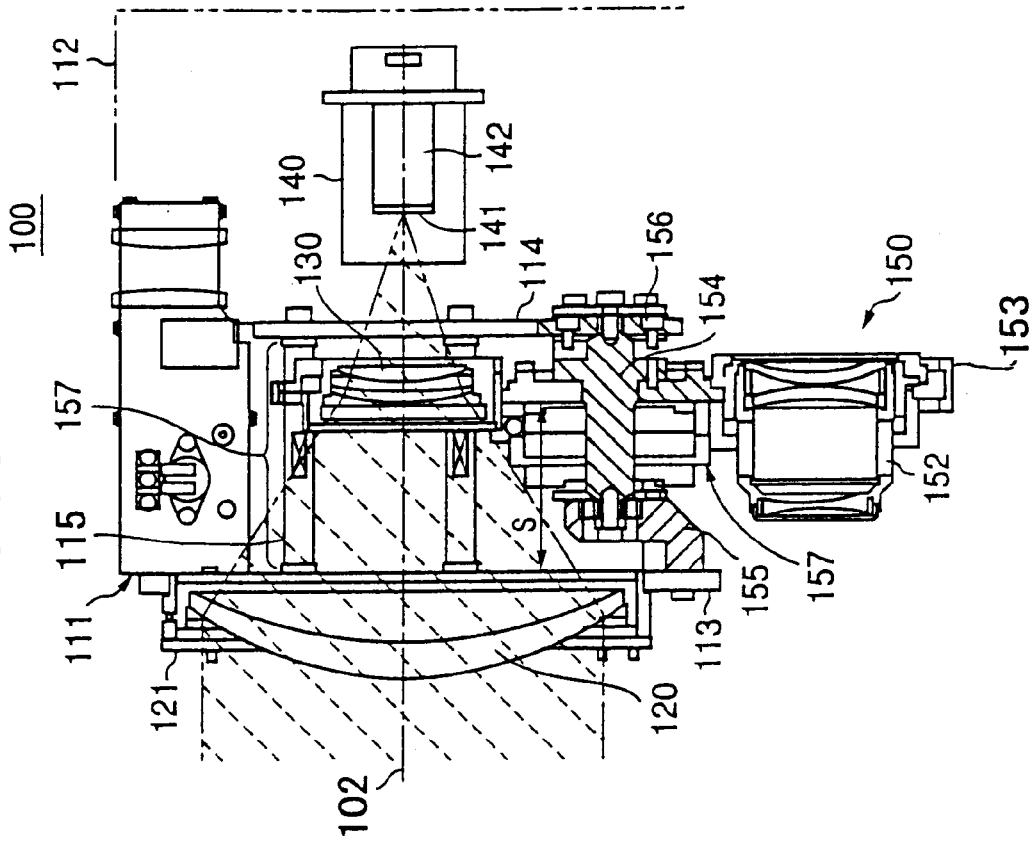
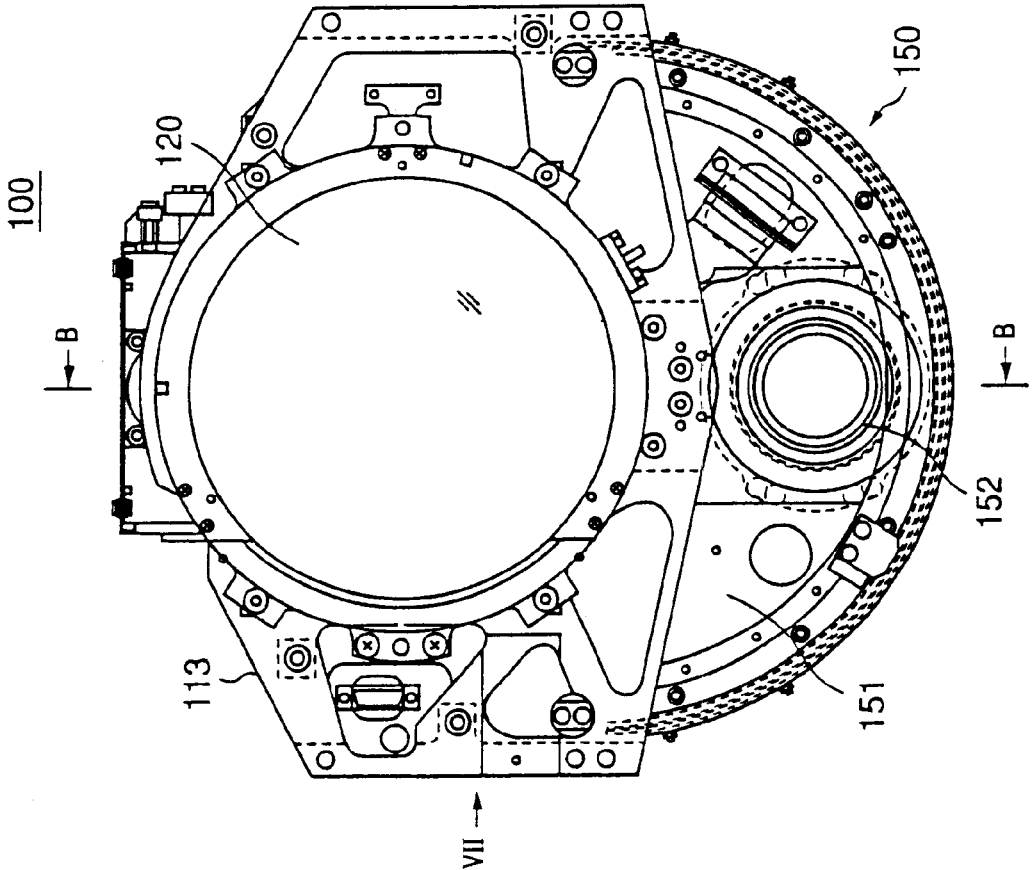
FIG. 6A
FIG. 6B

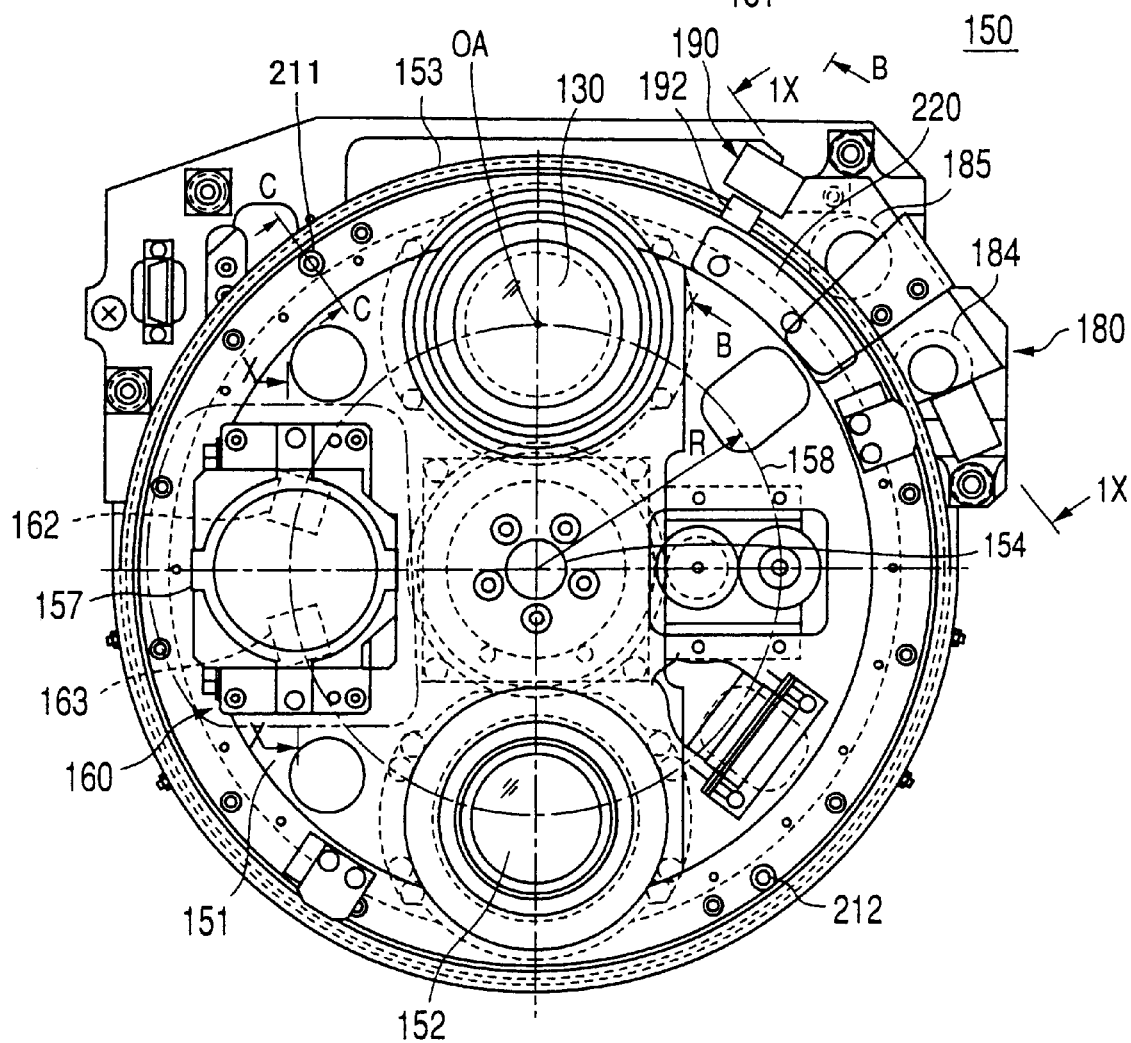

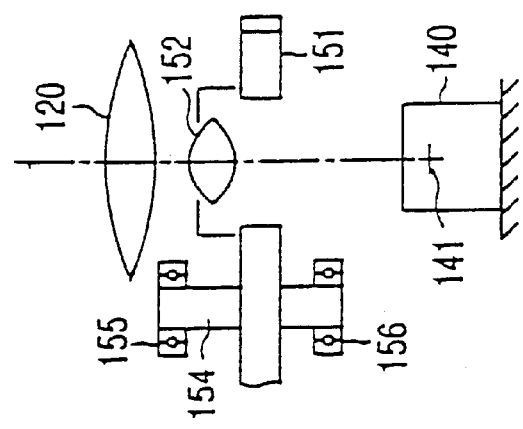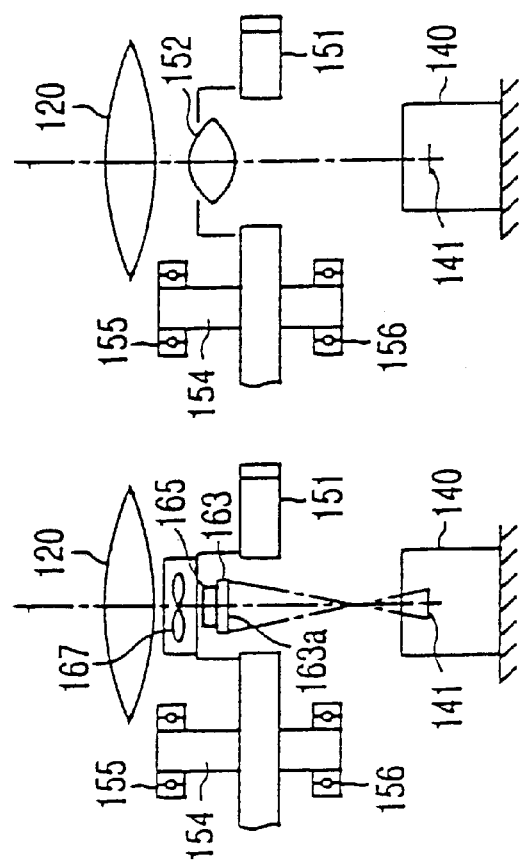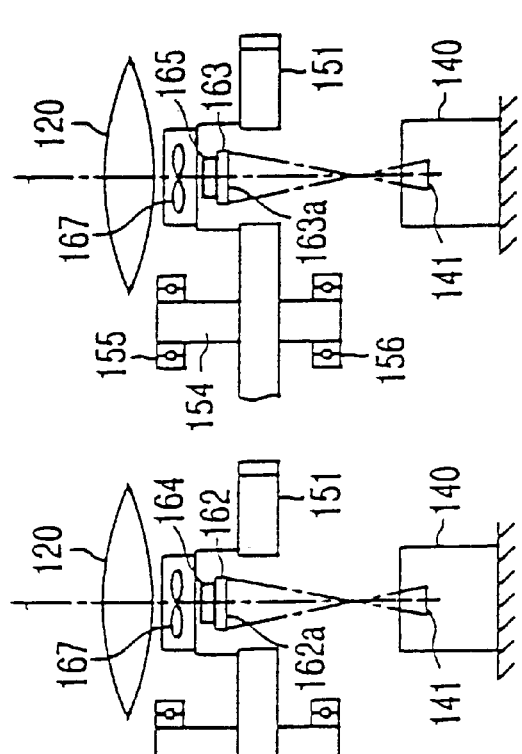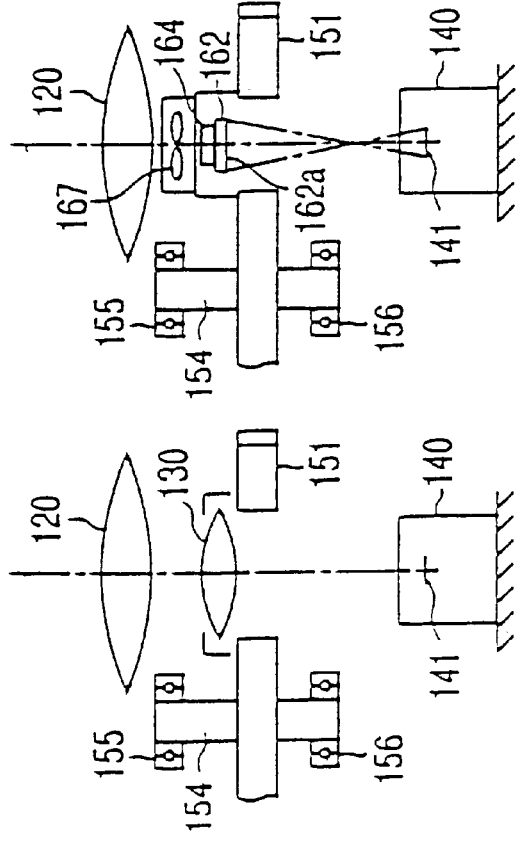

INFRARED IMAGING DEVICE

BACKGROUND OF THE INVENTION

1. Field of the Invention

The present invention generally relates to infrared imaging devices, and more particularly, to an infrared imaging device, including an infrared detector, a view switching function, and a sensitivity correction function.

2. Description of the Related Art

An infrared imaging device is, for instance, mounted on an airplane and used for recognizing an objective body on the ground or in the air. It has been required that an image taken by the infrared imaging device be of high quality and that the infrared imaging device be small and lightweight.

In addition, the infrared imaging device requires a view switching function and a sensitivity correction function.

Plural kinds of magnification lenses having different magnifications are switched on an optical axis by the view switching function of the infrared imaging device. Generally, the objective body is initially detected by a magnification lens having a low magnification. And then, the magnification lens having a low magnification is replaced by a magnification lens having a high magnification by the view switching function and thereby the objective body is recognized and distinguished.

Furthermore, dispersions of respective sensitivities of a great number of pixels comprising infrared detect elements are detected and corrected electrically by the sensitivity correction function. The quality of the image taken by the infrared imaging device may be improved by implementing the sensitivity correction as required.

FIG. 1A is a plan view of a related infrared imaging device 10. FIG. 1B is a section taken on line a—a in FIG. 1A. FIG. 1C is a section taken on line b—b in FIG. 1A. FIG. 2 is a schematic illustration of the related infrared imaging device 10. Referring to FIGS. 1A through 1C and 2, the infrared imaging device 10 includes a housing 11, an objective lens 12, a varying magnification lens 13, an infrared detector 14, a view switching mechanism 20, and a sensitivity correction mechanism 30. The objective lens 12, the varying magnification lens 13, and the infrared detector 14 are arranged in the line of an optical axis 15. The objective lens 12 is mounted on an upper surface of the housing 11. The varying magnification lens 13, the infrared detector 14, the view switching mechanism 20, and the sensitivity correction mechanism 30 are provided inside of the housing 11.

As shown in FIG. 2, an infrared light 16 radiated from the objective body is received by the objective lens 12 and the varying magnification lens 13 and reaches the infrared detect element 50 in the infrared detector 14. As a result, the infrared light 16 is focused into an image of the objective body on the infrared detect element 50. An output from the infrared detect element 50 is amplified and transmitted to the indication part 60. The image formed by the infrared imaging device is projected on the indication part 60.

The view switching mechanism 20 is supported in a state where the view switching mechanism 20 can be moved in the X1–X2 direction as shown in FIG. 1A. The view switching mechanism 20 includes a mount board 22, a motor 23 and a crank mechanism 24. The varying magnification lens 13 having a low magnification and the varying magnification lens 21 having a high magnification are mounted on the mount board 22. The mount board 22 can be moved in the X1–X2 direction by using the crank mechanism 24 driven with the motor 23.

The sensitivity correction mechanism 30 has a sensitivity correction base 33 and a motor 34. The sensitivity correction base 33 having a fan shape is supported by an output shaft 32 of a gear mechanism 31. The gear mechanism 31 is driven by the motor 34. A standard heat source board 35 of a normal temperature side and a mirror 36 as a standard heat source board of a low temperature side are provided on a lower surface of the sensitivity correction base 33. The sensitivity correction base 33 is arranged in a space 40 between the varying magnification lens 13 and the infrared detector 14.

The infrared detect element 50 is provided inside of the infrared detector 14. The infrared detect element 50 has a structure in which a great number of pixels are arranged in a matrix shape and is cooled cryogenically by a cooler not shown in FIGS. 1A through 1C and 2.

Sensitivity correction is implemented by utilizing the temperature of the infrared detect element 50 itself and a normal temperature. The motor 34 is driven and the sensitivity correction base 33 is rotated in the A–B direction shown in FIG. 1A by using the gear mechanism 31. First, the outputs of the respective pixels of the infrared detect element 50 are measured when the mirror 36 is moved onto the optical axis 15, and then the outputs are saved in digital form. Next, the standard heat source board 35 of the normal temperature side is moved onto the optical axis 15. Outputs of the respective pixels of the infrared detect element 50 are measured when an infrared light radiated from the standard heat source board 35 is received by the infrared detector 14, and then the outputs are saved in digital form. The sensitivity correction is implemented by reading out the saved information and calculating a correction coefficient. When the mirror 36 faces the infrared detector 14, the infrared detect element 50 is reflected in the mirror 36. Since the infrared detect element 50 is cooled cryogenically as described above, a cryogenically cooled infrared light radiated from the infrared detect element 50 is reflected by the mirror 36 and received at the infrared detect element 50.

The view switching is implemented by driving the motor 23 and moving the mount board 22 with the crank mechanism 24, and thereby the varying magnification lens 13 is displaced by a magnification lens 21 having a high magnification.

However, two motors are needed for the conventional infrared imaging device 10 because the conventional infrared imaging device 10 has the view switching mechanism 20 and the sensitivity correction mechanism 30 provided independently. Hence, it is difficult to miniaturize and reduce the weight of the infrared imaging device 10.

In addition, the sensitivity correction mechanism 30 has a structure in which the sensitivity correction base 33 is arranged in the narrow space 40 between the varying magnification lens 13 and the infrared detector 14. Therefore, it is difficult to provide a standard heat source having the sensitivity correction base 33 on which a peltier device is equipped. Rather, the standard heat source board 35 and the mirror 36 as the standard heat source board of a low temperature are provided on the sensitivity correction base 33 in the conventional infrared imaging device 10.

Accordingly, two kinds of standard temperature infrared lights, namely the infrared light radiated from the standard heat source board 35 and the infrared light cooled cryogenically, radiate to the infrared detect element 50. The difference of temperatures between the two kinds of standard temperature infrared lights provided to the infrared detect element 50 is 100 centigrade or more. Meanwhile, the objective body of the infrared imaging device 10 generates heat, and the objective body is detected with the infrared imaging device 10 by comparing a temperature in a background source with the objective body.

Furthermore, the sensitivity of the infrared detect element 50 is not proportional to the energy of the infrared light generated by the objective body. Rather, the infrared light has a property in that a secondary curved line can be drawn, wherein the energy of the infrared light is defined as the horizontal axis and the sensitivity of the infrared detect element 50 is defined as the vertical axis. Therefore, since the difference of temperatures of two kinds of standard temperature infrared light sources provided to the infrared detect element 50 of the conventional device is 100 centigrade or more, it is not possible to obtain a proper coefficient of the sensitivity correction by using the property of the sensitivity of the infrared detect element 50.

Hence, there may be a problem concerning the quality of the image taken by the infrared imaging device 10 and projected on the indication part 60.

SUMMARY OF THE INVENTION

Accordingly, it is a general object of the present invention is to provide a novel and useful infrared imaging device in which one or more of the problems described above are eliminated.

Another and more specific object of the present invention is to provide an infrared imaging device, including a board which is movable inside the infrared imaging device, plural kinds of magnification lenses, and plural kinds of infrared light radiation parts which radiate infrared lights having respective radiation temperatures, wherein the lenses and the infrared light radiation parts are situated on the board.

According to the present invention, it is possible to miniaturize and reduce the weight of the infrared imaging device, as compared to the conventional infrared imaging device having a board on which magnification lenses are mounted and a separate board on which infrared light radiation parts are mounted. In addition, it is possible to detect smaller differences regarding measurements of the infrared light radiation parts, and thereby the infrared light radiation parts can have a peltie device, for example. Furthermore, according to the present invention, it is possible to make 10 centigrade as the difference in temperature between the infrared light radiation parts of the high temperature side and the low temperature side. Because of this, it is possible to implement the sensitivity correction accurately.

The plural kinds of the infrared light radiation parts may be situated between the respective magnification lenses on the board and along a movement direction of the board.

According to the present invention, it is possible to implement a sensitivity correction of an infrared detect element of the infrared light radiation part during a view switching. Accordingly, whenever the view switching is implemented, the sensitivity correction is implemented. Hence, the accuracy of the sensitivity correction is improved, and thereby it is possible to provide a higher quality image.

The board may have a disk shape and the magnification lenses and the infrared light radiation parts may be arranged along an inner circumference of the board.

According to the present invention, it is possible to mount the magnification lenses and the infrared light radiation parts easily, and thereby it is possible to miniaturize the infrared imaging device. In addition, the movable board may have a tooth part, so that the movable board can be rotated by a gear of a small motor without a reduction gear motor unit.

The infrared light radiation parts may include a base part which is fixed to the board.

According to the present invention, it is possible to miniaturize the infrared light radiation parts because only one base part is used for mounting the infrared light radiation parts thereon.

The other object of the present invention is to provide an infrared imaging device having an infrared detector, including magnification lenses, and view switching means for switching from one of the magnification lenses to another magnification lens, sensitivity correction means for correcting a displacement of a sensitivity of the infrared detector, wherein the magnification lenses and the sensitivity correction means are situated on the view switching means.

Other objects, features, and advantages of the present invention will be more apparent from the following detailed description when read in conjunction with the accompanying drawings.

BRIEF DESCRIPTION OF THE DRAWINGS

FIG. 5A is a schematic view of the infrared imaging device 100 taken in a direction of an arrow A in FIG. 4 according to the present invention;

FIG. 5B is a schematic view of the infrared imaging device 100 taken in a direction of an arrow B in FIG. 4 according to the present invention;

FIG. 6A is a view of the infrared imaging device 100 taken in a direction of an arrow A in FIG. 4 according to the present invention;

FIG. 6B is a section taken on a line B—B in FIG. 6A according to the present invention;

FIG. 7A is a view of a view switching mechanism 150 taken in the direction of the arrow A in FIG. 4 according to the present invention;

FIG. 7B is a section taken on line B—B in FIG. 7A according to the present invention;

FIG. 7C is a section taken on line C—C in FIG. 7A according to the present invention;

FIG. 13A is a view for explaining an action of switching view according to the present invention;

FIG. 13B is a view for explaining an action of switching view according to the present invention;

FIG. 13C is a view for explaining an action of switching view according to the present invention; and FIG. 13D is a view for explaining an action of switching view according to the present invention.

DETAILED DESCRIPTION OF THE PREFERED EMBODIMENTS

A description will now be given, with reference to the drawings, of embodiments of the present invention.

Figure 1A:
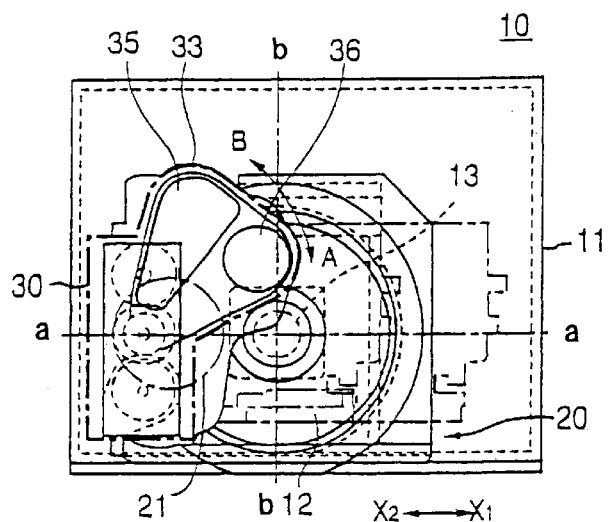
FIG. 1A is a plan view of a related infrared imaging device 10.
Figures 1B, 1C:
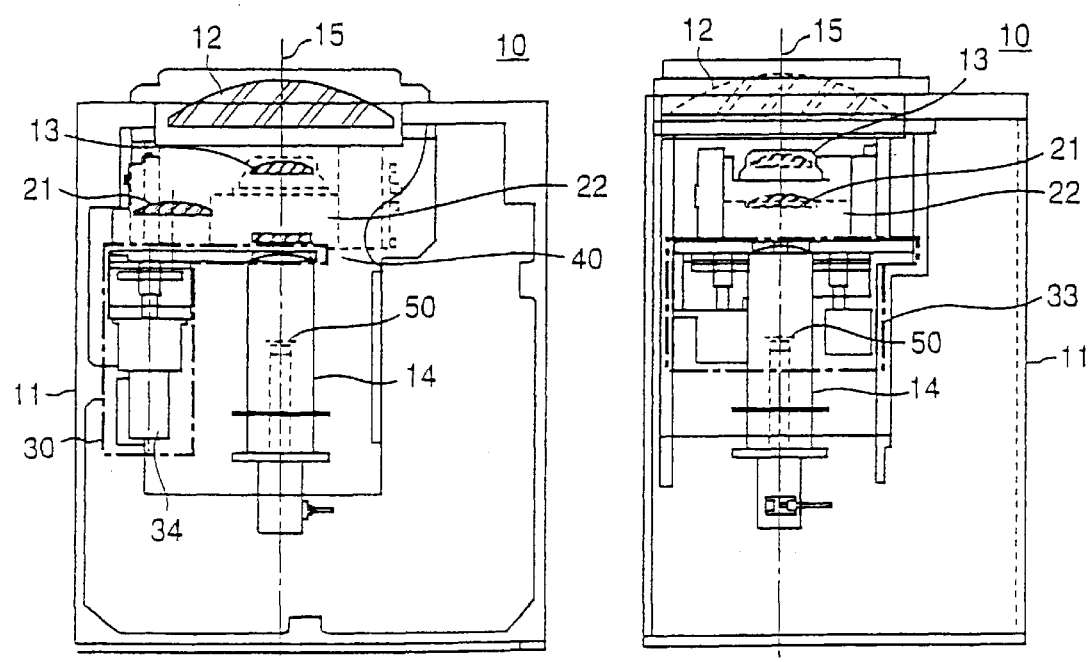
FIG. 1B is a section taken on line a—a in FIG. 1A.
FIG. 1C is a section taken on line b—b in FIG. 1A.
Figure 2:
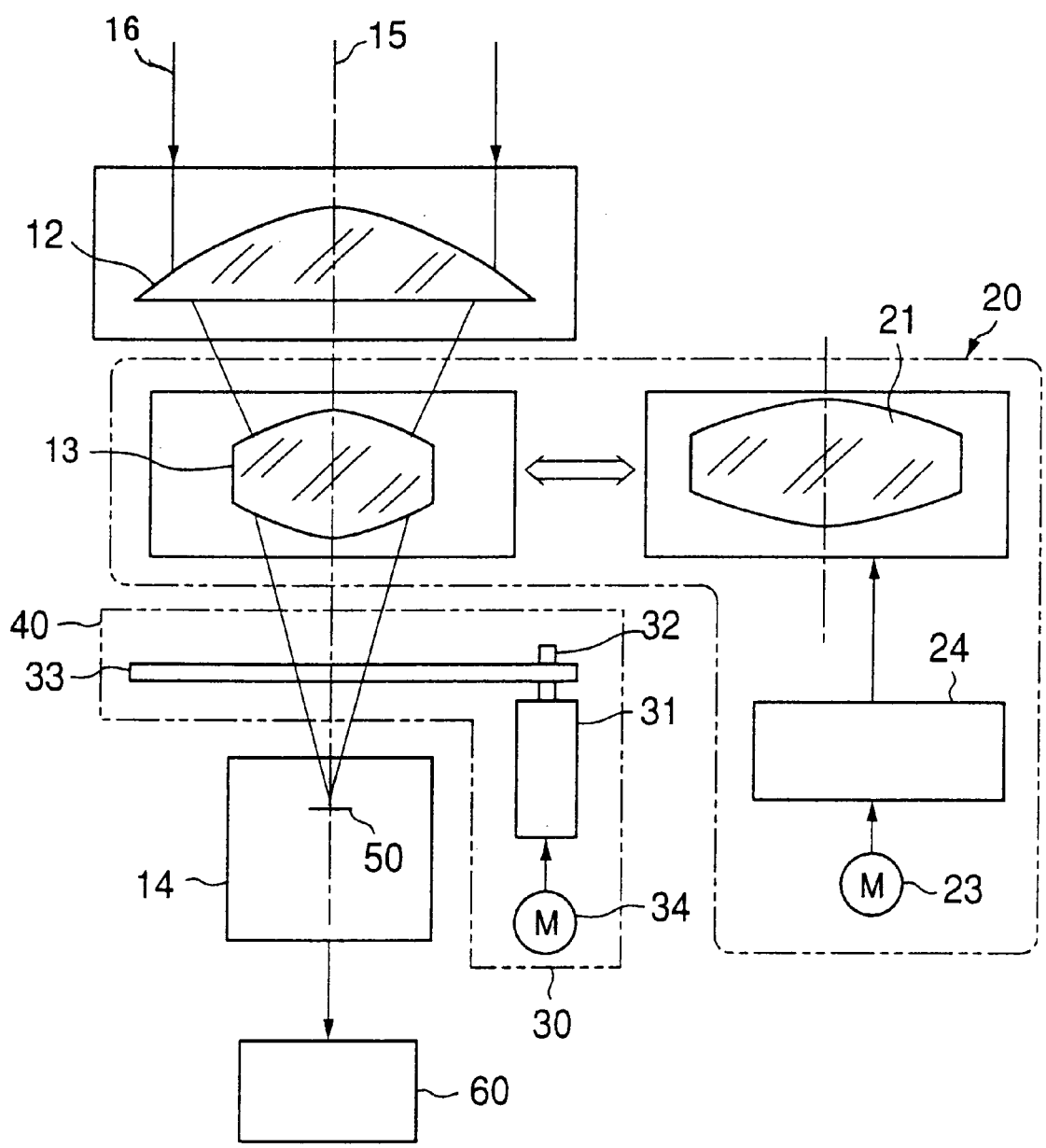
FIG. 2 is a schematic illustration of the related infrared imaging device 10.
Figure 3:
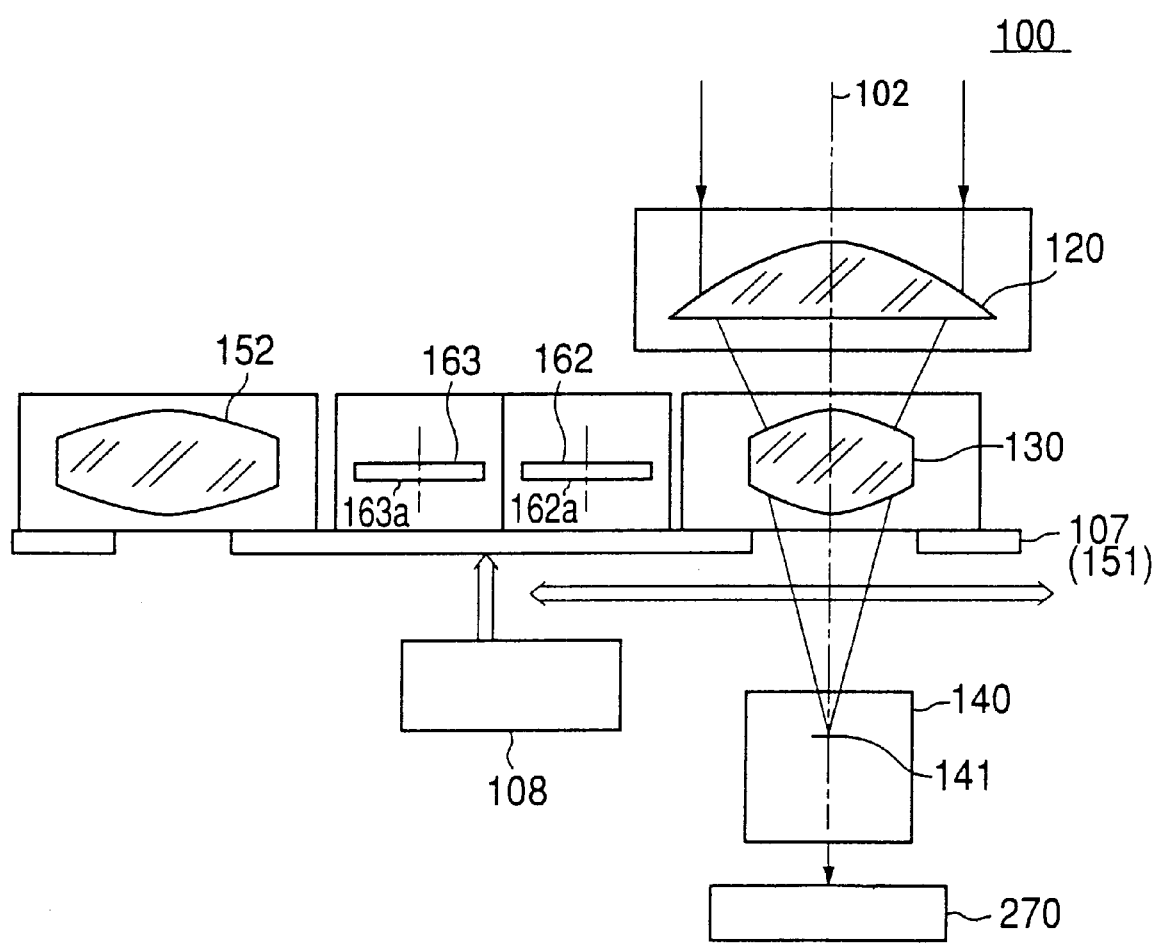
FIG. 3 is a schematic illustration of the infrared imaging device 100 according to the present invention.

FIG. 3 is a schematic illustration of the infrared imaging device 100 of an embodiment according to the present invention. Referring to FIG. 3, an objective lens 120 and an infrared detector 140 are arranged in the line of an optical axis 102. A varying high magnification lens 130, a varying low magnification lens 152, and a standard heat board 162 of a high temperature side and a standard heat board 163 of a low temperature side as standard temperature infrared radiation parts, are mounted on a mount board 107. The mount board 107 can be moved by a moving mechanism 108, and thereby the varying high magnification lens 130 can be displaced on the optical axis 102 by the varying low magnification lens 152. During a process of the displacement of the varying high magnification lens 130 and the varying low magnification lens 152, the standard heat board 162 of the high temperature side and the standard heat board 163 of the low temperature side are arranged, one after another, in the line of the optical axis 102.

Figure 4:
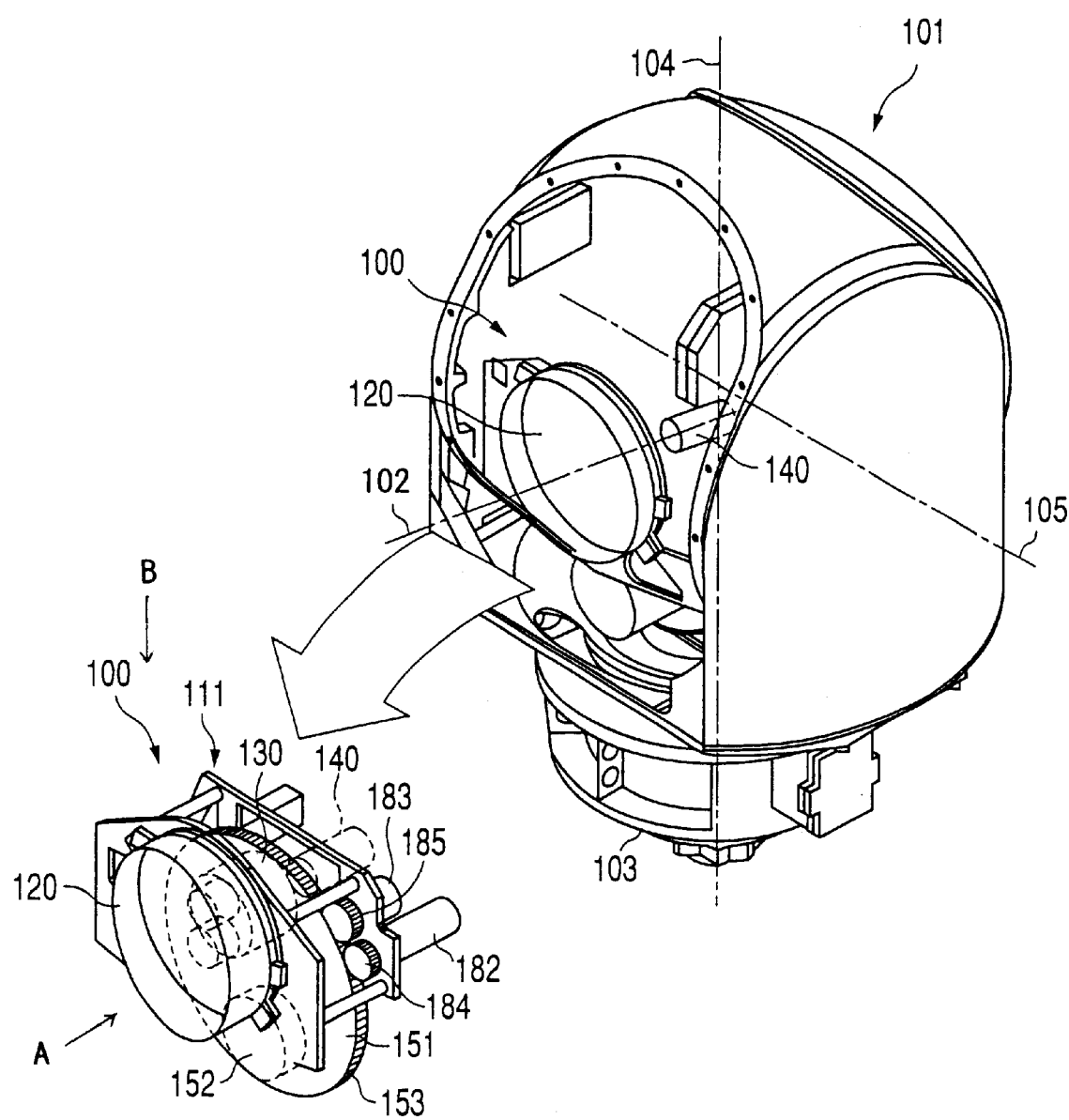
FIG. 4 is a perspective view showing an infrared imaging device 100 according to the present invention, in a state where a front cover of a housing 101 is removed.

FIG. 4 is a perspective view showing the infrared imaging device 100 of an embodiment according to the present invention, in a state where a front cover of a housing 101 is removed. Referring to FIG. 4, the infrared imaging device 100 is provided inside of the housing 101. The housing 101 has a base part 103 mounted, for example, on an airplane, a car or a ship. The housing 101 can be rotated in a state where a vertical axis 104 or a horizontal axis 105 is a center of the rotation. If the position of the airplane or others is varied, the housing 101 is rotated. In addition, the direction and the angle to the objective body from the infrared imaging device 100 are also varied, and thereby the objective body is tracked by using the optical axis 102 of the infrared imaging device 100.

FIG. 5A is a schematic view of the infrared imaging device 100 taken in a direction of an arrow A in FIG. 4 according to the present invention. FIG. 5B is a schematic view of the infrared imaging device 100 taken in a direction of an arrow B in FIG. 4 according to the present invention. FIG. 6A is a view of the infrared imaging device 100 taken in a direction of an arrow A in FIG. 4 according to the present invention. FIG. 6B is a section taken on a line B—B in FIG. 6A according to the present invention.

Referring to FIG. 6B, the infrared imaging device 100 has a structure where the objective lens 120, the varying magnification lens 130 or the varying low magnification lens 152, and an infrared detector 140 are arranged in the line of an optical axis 102. Furthermore, the infrared imaging device 100 has a switching mechanism 150, in which not only the varying high magnification lens 130 and the varying low magnification lens 152 but also the standard heat board 163 of a low temperature side and the standard heat board 162 of a high temperature side having peltier devices are provided on a view switching disk 151. That is, the switching mechanism 150 includes not only a view switching function but also a sensitivity correction function.

The infrared imaging device 100 has a structure in which a sub frame structure body 111 is screw fixed to a main frame 112. In the sub frame structure body 111, an upper frame 113 and a lower frame 114 are connected by a plurality of pillar members 115.

The objective lens 120 is fixed on the upper frame 113 by a lens holder 121.

The infrared detector 140 has an integrated detector cooler assembly (IDCA) structure. An infrared detect element 141 is provided inside of the infrared detector 140 and on a head end part of a cooler head 142. The infrared detect element 141 has a structure wherein a great number of pixels are arranged in a matrix shape. The infrared detect element 141 is cooled cryogenically by an outside compressor not shown in FIG. 6B with a cooler head 142.

Next, the view switching mechanism 150 including the sensitivity correction function as well as the view switching function will be described.

Tooth parts 153 are situated around the whole circumference of the view switching disk 151 as a mount board. A shaft 154 is provided at a center of the view switching disk 151. A head end part of the shaft 154 is supported by a bearing member 155 fixed on a frame 113. A rear end part of the shaft 154 is supported by a bearing member 156 fixed on a frame 114. As a result, the shaft 154 can be rotated. The view switching disk 151 is situated at a position near the frame 114 in a space 157 between the frame 113 and the frame 114.

FIG. 7A is a view of a view switching mechanism 150 taken in the direction of the arrow A in FIG. 4 according to the present invention. FIG. 7B is a section taken on line B—B in FIG. 7A according to the present invention. FIG. 7C is a section taken on line C—C in FIG. 7A according to the present invention As shown in FIG. 7A, the view switching disk 151 includes a circumference 158 having a radius R and a center where the shaft 154 is situated. The circumference 158 intersects the optical axis 102. The varying low magnification lens 152, the varying high magnification lens 130, and a standard heat source unit 160 having the peltier device are located on the circumference 158. It is possible to get a wide view to detect the objective body, by using the varying low magnification lens 152. It is possible to get a narrow view to recognize and distinguish the objective body, by using the varying high magnification lens 130. The varying high magnification lens 130 and the varying high magnification lens 152 are situated symmetrically regarding the shaft 154, namely on a diameter from the center where the shaft 154 is situated. The standard heat source unit 160 is situated at a middle position of a circumference direction between the varying high magnification lens 130 and the varying high magnification lens 152.

Figure 8:
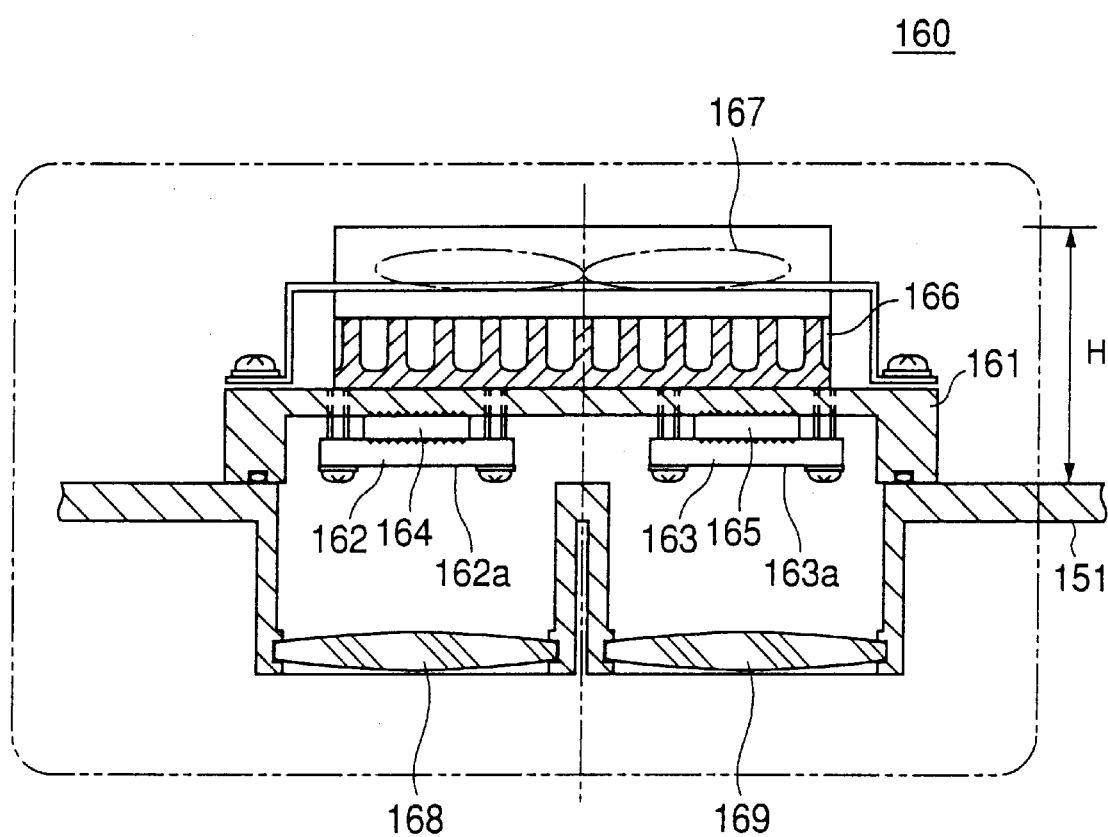
FIG. 8 is a section taken on line X—X in FIG. 7A according to the present invention.

FIG. 8 is a section taken on line X—X in FIG. 7A according to the present invention. As shown in FIG. 8, the standard heat source unit 160 as the standard temperature infrared radiation part includes a base 161. The peltier device 164 is screw fixed between the standard heat board 162 of a high temperature side and a lower surface of the base part 161. Similarly, the peltier device 165 is screw fixed between the standard heat board 163 of a low temperature side and a lower surface of the base part 161. A radiation fin 166 is fixed on an upper surface of the base part 161. A fan 167 is provided over the radiation fin 166. The standard heat board 162 of a high temperature side has a surface 162a for radiating an infrared light uniformly. Similarly, the standard heat board 163 of a low temperature side has a surface 163a for radiating an infrared light uniformly. The view switching disk 151 includes condenser lens 168 and 169. The base 161 is screw fixed to the view switching disk 151. The standard heat board 162 of a high temperature side faces the condenser lens 168 and the standard heat board 163 of a low temperature side faces the condenser lens 169. The standard heat board 162 of a high temperature side and the standard heat board 163 of a low temperature side are located on the circumference 158 as shown in FIG. 7A.

The peltier devices 164 and 165 are controlled, so that the standard heat board 162 of a high temperature side has a temperature having approximately 10 centigrade more than a back ground average temperature. The back ground average temperature is based on an average value of an optical electric current from respective pixels of the infrared detect element 141 when infrared imaging is implemented. The standard heat board 163 of a low temperature side has a temperature having approximately 10 centigrade less than the back ground average temperature based on the average value of the optical electric current from respective pixels of the infrared detect element 141 when infrared imaging is implemented.

As shown in FIG. 8, the standard heat source unit 160 has a height H from an upper surface of the view switching disk 151. On the other hand, as shown in FIG. 6B, since the varying high magnification lens 130 and the varying low magnification lens 152 are mounted on the view switching disk 151, there is a longer distance S from the upper surface of the view switching disk 151 to the frame 113 than the height H.

Figure 9:
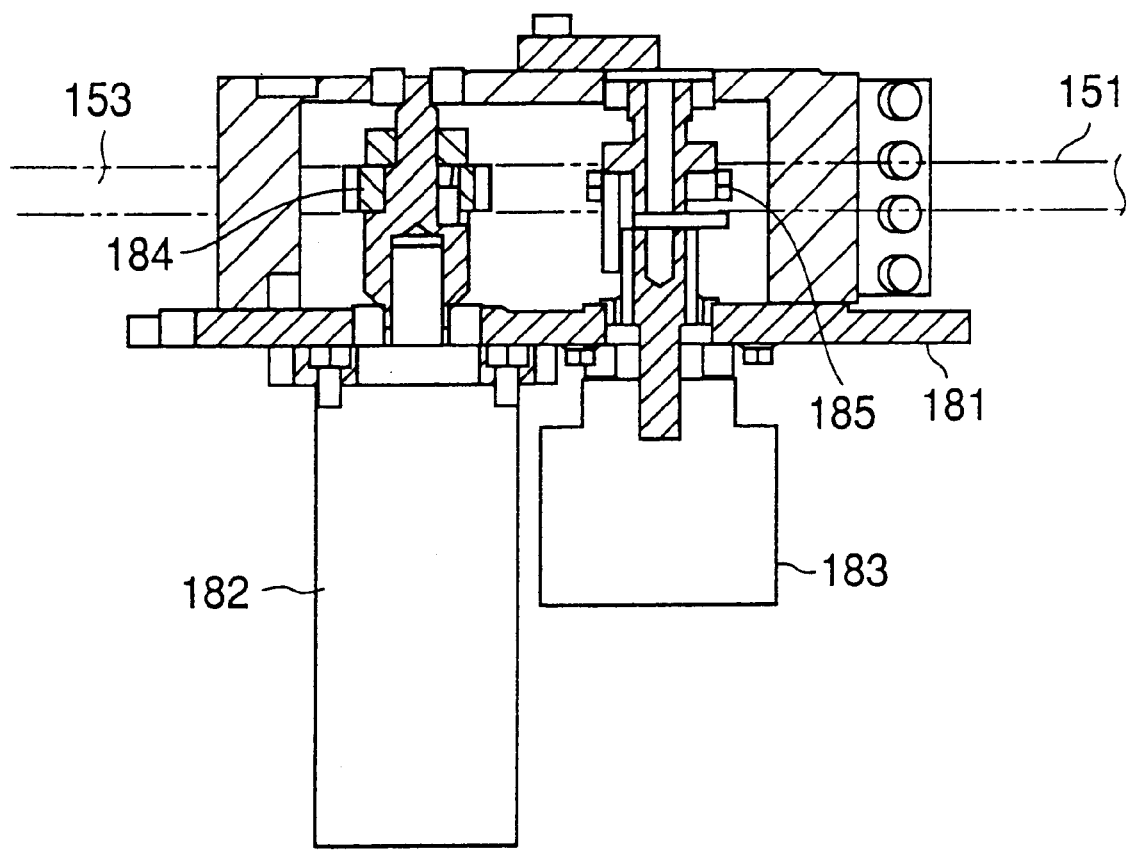
FIG. 9 is a section taken on line 1X—1X in FIG. 7A according to the present invention.

FIG. 9 is a section taken on line 1X—1X shown in FIG. 7A according to the present invention.

As shown in FIGS. 7A and 9, the view switching mechanism 150 includes a motor encoder unit 180. In the motor encoder unit 180, a motor 182 and an encoder 183 are fixed on a board 181. A gear 184 is fixed to the motor 182 and a gear 185 is fixed to the encoder 183. The motor encoder unit 180 is screw fixed to the frame 114 shown in FIG. 6B. The gears 184 and 185 mesh with the tooth parts 153 of the view switching disk 151. When the motor 182 is driven, the view switching disk 151 is rotated and the encoder 183 outputs a signal of a position of a rotation of the view switching disk 151. The gear 184 has a much shorter diameter than a diameter of the view switching disk 151. Hence, the outputs of the motor 182 for rotating the view switching disk 151 may be small. In addition, a reduction gear motor unit is not necessary for the motor encoder unit 180.

As shown in FIGS. 7A and 7B, the view switching mechanism 150 includes a guide unit 190. A couple of guide rollers 192 and 193 are provided in the guide unit 190. The guide unit 190 is screw fixed to the frame 114 shown in FIG. 6B. Upper and lower surfaces of an edge part of a circumference of the view switching disk 151 are put between the guide rollers 192 and 193. The upper and lower surfaces of the edge part of the circumference of the view switching disk 151 pass between the guide rollers 192 and 193 and are rotated with a reduced possibility of the generation of a side deflection.

Figure 10:
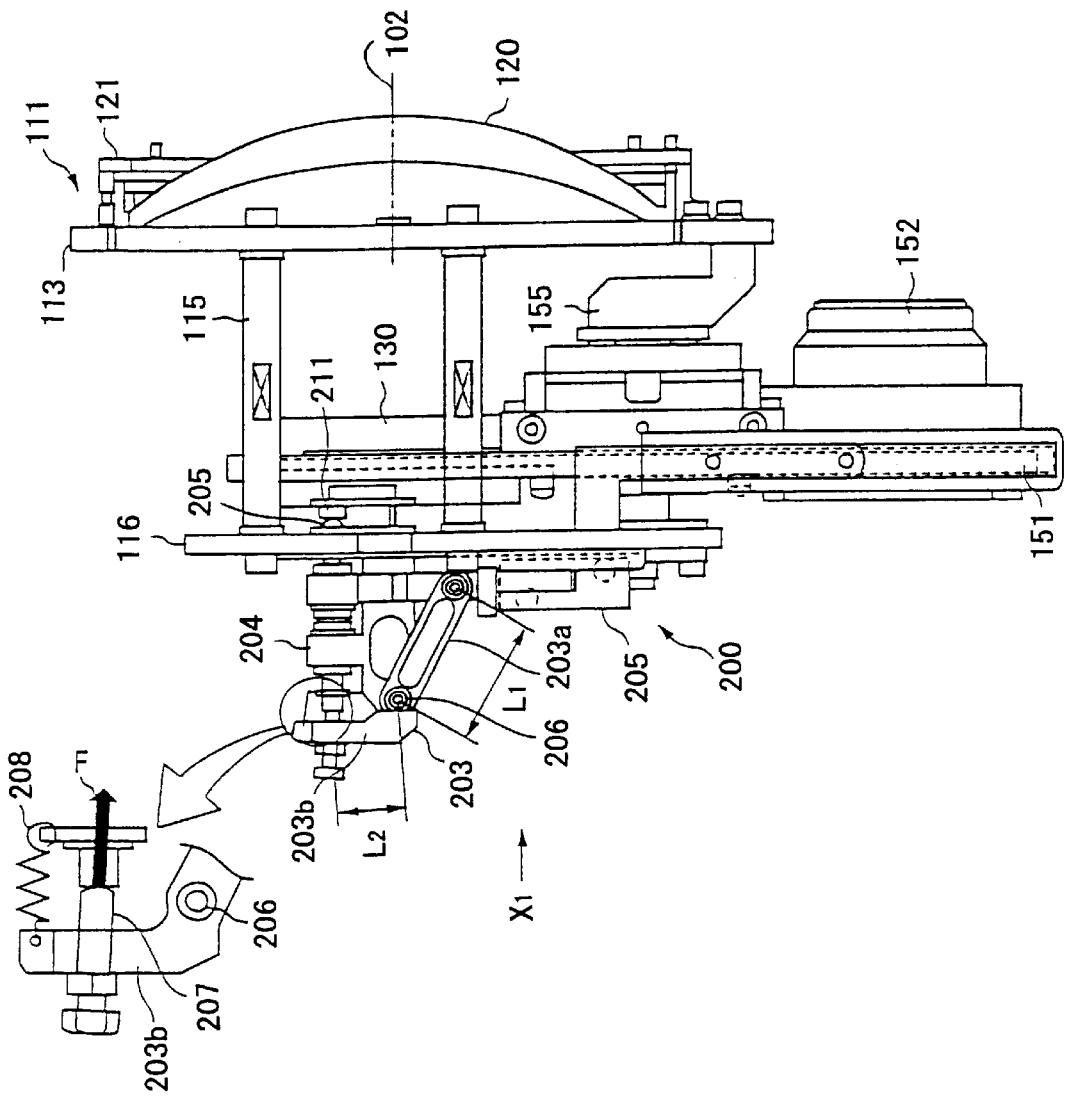
FIG. 10 is a view taken in a direction of an arrow VII in FIG. 6A according to the present invention.
Figure 11:
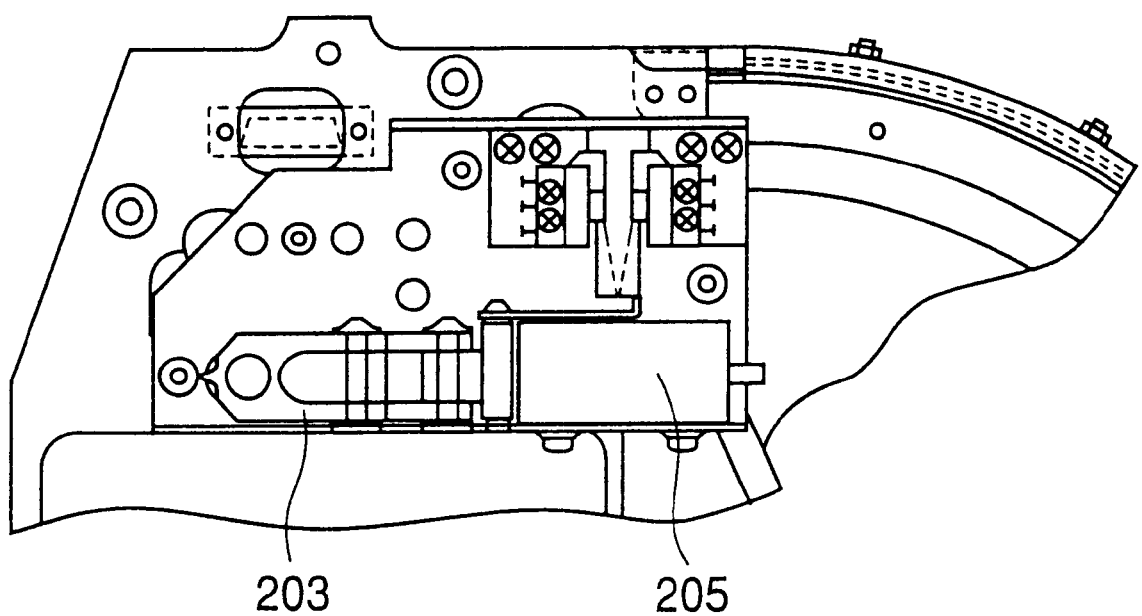
FIG. 11 is a view taken in a direction of an arrow X1 in FIG. 10 according to the present invention.

FIG. 10 is a view taken in a direction of an arrow VII in FIG. 6A according to the present invention. FIG. 11 is a view taken in a direction of an arrow X1 in FIG. 10 according to the present invention.

As shown in FIGS. 7A, 7C, 10 and 11, the infrared imaging device 100 has a lock mechanism unit 200. The lock mechanism unit 200 includes a solenoid 205, an arm member 203 having an L shape, and a plunger bearing member 204. A plunger 400 is provided in the plunger bearing member 204. The arm member 203 having an L shape is supported by a pin 206 situated on the frame member 201. The arm member 203 has an arm part 203a having a length of L1 and an arm part 203b having a length of L2. The length of L1 of the arm part 203a is longer than the length of L2 of the arm 203b. The arm part 203a is connected to a rod of the plunger 400. The lower end of the plunger 400 is supported by an adjustment screw 207 provided at a head end part of the arm part 203b supports the lower end of the plunger 400. Receiving members 211 and 212 are provided at positions of a point symmetry of the shaft 154 on the view switching disk 151. A concave part 211a having a cone shape is provided at a lower end surface of the receiving member 211. Similarly, a concave part not shown in FIG. 8 and having a cone shape is provided at a lower end surface of the receiving members 212.

When the view switching disk 151 is rotated and reaches a designated position and the solenoid 205 is driven, the arm member 203 having an L shape is rotated and thereby the plunger 400 is pushed up. As a result, a head end part having a cone shape of the plunger 400 is clamped with the concave part 211a having a cone shape, and thereby the view switching disk 151 is locked at the position. Since the length of L1 of the arm part 203a is longer than the length of L2 of the arm 203b, a force F by which the plunger 400 is pushed up becomes stronger than a driving force of the solenoid 205, and thereby the view switching disk 151 is locked tightly.

The view switching disk 151 has a balance-weight 220 as shown in FIG. 7A. The balance-weight 220 is screw fixed at a designated position of the view switching disk 151, and thereby a balance of rotation of the view switching disk 151 is obtained.

A structure with regard to the sensitivity correction function will be described.

Figure 12:
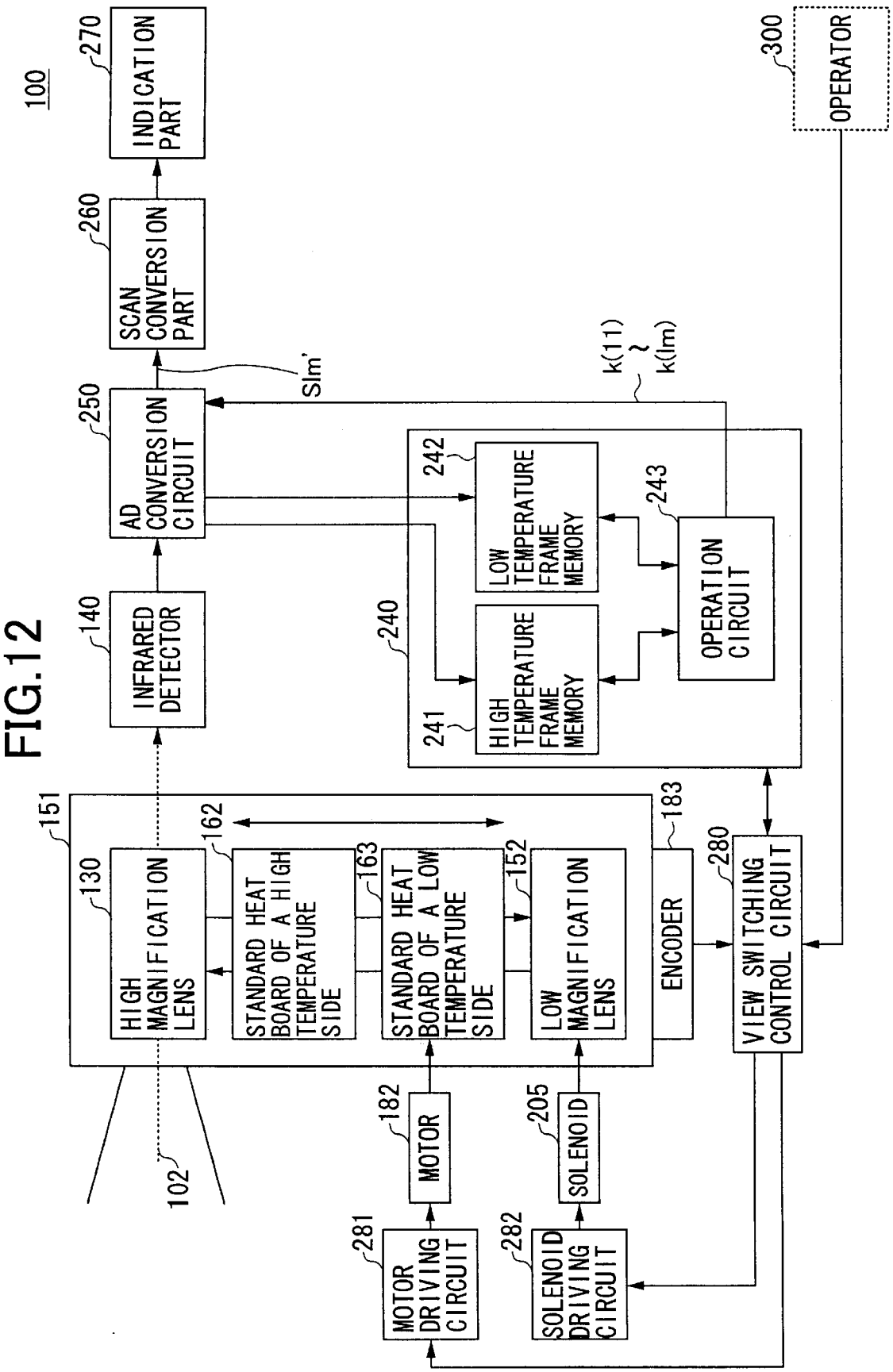
FIG. 12 is a block diagram of the infrared imaging device 100 according to the present invention.

FIG. 12 is a block diagram of the infrared imaging device 100 according to the present invention. As shown in FIG. 12, a circuit 240 for the sensitivity correction for the infrared detector 140 is provided at the infrared imaging device 100. The sensitivity correction circuit 240 is connected to an AD conversion circuit 250 connected to an output of the infrared detector 140. The AD conversion circuit 250 includes a high temperature frame memory 241, a low temperature frame memory 242, and an operation circuit 243. High temperature data detected by the standard heat board 162 of a high temperature side is stored in the high temperature frame memory 241. Low temperature data detected by the standard heat board 163 of a low temperature side is stored in the low temperature frame memory 242. Designated operation are performed on the heat temperature data and the low temperature data and thereby a coefficient of the sensitivity correction is calculated by the operation circuit 243.

Next, a method of the operation of the sensitivity correction will be described.

First, different temperature data are operated on for every element by the high temperature data and the low temperature data as follows.

$$S11(\Delta T)=S11(T1)-S11(T2) \quad \text{(Formula 1-11)}$$

$$S12(\Delta T)=S12(T1)-S12(T2) \quad \text{(Formula 1-12)}$$

$$Slm(\Delta T)=Slm(T1)-Slm(T2) \quad \text{(Formula 1-lm)}$$

"$Slm(\Delta T)$" is defined as a signal of the different temperature in a case where "l" is defined as a horizontal pixel, and "m" is defined as a vertical pixel. "T1" is defined as a high temperature. "T2" is defined as a low temperature.

Next, an average $S(\Delta T)$ of the different temperature data calculated by the above mentioned formulas, "Formula 1-11" through "Formula 1-lm", is calculated as follows.

$$S(\Delta T) = (\Sigma Slm(\Delta T))/n \quad \text{(Formula 2)}$$

Here, "n" is a whole number of the pixel.

After that, the coefficient of the sensitivity correction k(lm) for every pixels is calculated, by using the different temperature data calculated by the "Formula 1-11" through "Formula 1-lm" and the average "$S(\Delta T)$" of the different temperature data calculated by "Formula 2", as follows.

$$k(11) = S11(\Delta T)/S(\Delta T) \quad \text{(Formula 3-11)}$$

$$k(12) = S11(\Delta T)/S(\Delta T) \quad \text{(Formula 3-12)}$$

$$k(lm) = Slm(\Delta T)/S(\Delta T) \quad \text{(Formula 3-lm)}$$

In the AD conversion circuit 250, the coefficient of the sensitivity correction "k(lm)" operated by the operation circuit 243 multiples by each signal "Slm" of pixels. An output signal "Slm'" is output from the AD conversion circuit 250.

$$S11' = S11 \times k(11) \quad \text{(Formula 4-11)}$$

$$S12' = S12 \times k(12) \quad \text{(Formula 4-12)}$$

$$Slm' = Slm \times k(lm) \quad \text{(Formula 4-lm)}$$

After the sensitivity is corrected, infrared image data is converted to an indication format such as a television scan method by a scan conversion part 260 in FIG. 12. The infrared image is indicated by the indication part 270.

In addition, the motor 182 and the solenoid 205 are driven by a view switching control circuit 280 which receives an order for view switching from the operator 300. Furthermore, rotation angle position data of the view switching disk 151 is supplied from an encoder 183 to the view switching control circuit 280, and the view switching disk 151 is rotated. When the standard heat board 162 of a high temperature side and the standard heat board 163 of a low temperature side reach the optical axis 102, the circuit 240 for the sensitivity correction is actuated.

Next, the action of the view switching of the infrared imaging device 100 and the action of the sensitivity correction implemented during the action of the view switching will be explained.

FIGS. 13A through 13D are views for explaining an action of switching view according to the present invention.

As shown in FIG. 13A, the infrared imaging device 100 has the varying high magnification lens 130 situated on the optical axis 102. The infrared detect element 141 of the infrared detector 140 is cooled cryogenically by the cooler head 142 of the outside compressor not shown in FIG. 13A.

When an order by which the view is switched from the varying high magnification lens 130 to the varying low magnification lens 152 is ordered by the operator 300, the view switching control circuit 280 is actuated based on the order, and thereby the infrared imaging device 100 is actuated.

As shown in FIG. 10, first of all, the solenoid 205 is actuated based on the order from the view switching control circuit 280. The arm member 203 is rotated and the plunger 400 is moved downwardly pulling against the spring 208. As a result, the plunger 400 is no longer in contact with the concave part 211a having a cone shape of the receiving member 211, and thereby the view switching disk 151 is unlocked. In addition, based on the order from the view switching control circuit 280, the motor driving circuit 281 is actuated and the motor 182 is driven. As a result, the view switching disk 151 starts rotating clockwise in FIG. 8 with at the rate of 180 degrees per second. The encoder 183 outputs a signal of rotation position of the view switching disk 151.

When the view switching disk 151 is rotated 75 degrees, the standard heat board 162 of a high temperature side approaches and crosses onto the optical axis 102, as shown in FIG. 13B. Based on the signal from the encoder 183, the view switching control circuit 280 outputs an order to make the motor 182 pause and an order to obtain the high temperature to the sensitivity correction 240. During the time interval that the standard heat board 162 of a high temperature side is on the optical axis 102, the high temperature data from the standard heat board 162 of a high temperature side is detected by the infrared detector 140, and the detected high temperature data are stored in the high temperature frame memory 241.

When the view switching disk 151 is rotated an additional 30 degrees, the standard heat board 163 of a low temperature side approaches and crosses onto the optical axis 102, as shown in FIG. 13C. Based on the signal from the encoder 183, the view switching control circuit 280 outputs an order to make the motor 182 pause again and an order to obtain the low temperature to the sensitivity correction 240. During the time interval that the standard heat board 163 of a low temperature side is on the optical axis 102, the low temperature data from the standard heat board 163 of a low temperature side is detected by the infrared detector 140, and the detected low temperature data are stored in the low temperature frame memory 242.

After that, the operation circuit 243 operates on the high temperature data and the low temperature data as described above, to obtain the coefficient of the sensitivity correction. The coefficient of the sensitivity correction calculated by the operation circuit 243 is supplied to the AD conversion circuit 250.

When the view switching disk 151 is rotated another 75 degrees, as shown in FIG. 13D, the varying low magnification lens 152 approaches and crosses onto the optical axis 102. Based on the signal from the encoder 183, the view switching control circuit 280 outputs an order to make the motor 182 stop and an order to drive the solenoid 205. As a result, the motor 182 stops and a solenoid driving circuit 282 is actuated, and thereby the solenoid 205 is driven.

Based on stopping of the motor 182, the view switching disk 151 stops rotating. When the solenoid 205 is driven, as shown in FIG. 10, the arm 203 is pulled and rotated, and thereby the plunger 400 is pushed up. As a result, the view switching disk 151 is clamped with a lower end surface having a cone and concave shape of the receiving member 212. The view switching disk 151 is locked at a position where a center of the varying low magnification lens 152 is on the optical axis 102. The solenoid 205 continues to be driven.

The infrared light from the objective body is built up as an image, through the objective lens and the varying low magnification lens 152, on the infrared detect element 141 of the infrared detector 140. The output signal in which the coefficient of the sensitivity correction is multiplied by the signals of the respective pixels are output from the AD conversion circuit 250.

The output signal from the AD conversion circuit 250 is converted to the indication format such as the television scan method by a scan conversion part 260, and thereby the infrared image having a low magnification is indicated on the indication part 270.

When an order for view switching from the varying low magnification lens 152 to the varying high magnification lens 130 is ordered by an operator 300, the view switching control circuit 280 receives the order and is actuated. In addition, the infrared imaging device 100 is actuated as follows. First of all, the view switching disk 151 starts rotating counterclockwise in FIG. 7A by 180 degrees per second. During the counterclockwise rotation, the low temperature data are detected by the standard heat board 163 of a low temperature side, and then the high temperature data are detected by the standard heat board 162 of a high temperature side. As a result, a new coefficient of the sensitivity correction is calculated by the operation circuit 243. The image of the objective body is taken by the infrared detector 140 with the varying high magnification lens 130. An output signal in which the signal of the respective pixels is multiplied by the new coefficient of the sensitivity correction is output from the AD conversion circuit 250. The output signal from the AD conversion circuit 250 is converted to an indication format such as a television scan method by the scan conversion part 260, and the infrared image having a high magnification is indicated on the indication part 270.

Thus, the coefficient of the sensitivity correction is calculated whenever the view is switched. Therefore, an accuracy of the sensitivity correction of the infrared detect element 141 is improved. In addition, after the view switching is implemented, a signal corrected by a new calculated coefficient of the sensitivity correction is output. Hence, an infrared image having a higher quality is indicated on the indication part 270.

Furthermore, it is possible to calculate the coefficient of the sensitivity correction again, if needed. In this case, the view switching disk 151 is rotated to one direction by approximately 105 degrees. Within the last approximately 30 degrees of the approximately 105 degrees, the data are detected from first the standard heat board 162 of a high temperature side and then the standard heat board 163 of a low temperature side, or first the standard heat board 163 of a low temperature side and then the standard heat board 162 of a high temperature side. As a result, the new coefficient of the sensitivity correction operated by the operation circuit 243 is calculated. After that, the view switching disk 151 is reverse-rotated back to the former position.

As described above, the infrared imaging device 100 has a structure in which the varying low magnification lens 152, the varying high magnification lens 130, the standard heat board 162 of a high temperature side, and the standard heat board 163 of a low temperature side are provided on the single view switching disk 151.

If the varying low magnification lens 152 and the varying high magnification lens 130 are provided on a mount board, and the standard heat board 162 of a high temperature side and the standard heat board 163 of a low temperature side are provided on the other mount board, a motor and an encoder are necessary for each mount board. On the other hand, according to the present invention, only one motor 182 and only one encoder 183 are necessary. Furthermore, the mechanism and the electric circuit are simple. Hence, according to the present invention, the infrared imaging device 100 has a small size and can be manufactured at a low cost.

Furthermore, the motor encoder unit 180 is small and arranged at a position where the infrared light passing through the objective lens 120 and reaching the infrared detector 140 is not interfered with.

In addition, instead of the view switching disk 151, a rectangular board may be used in the present invention. Furthermore, three or four of the magnification lenses may be mounted on the view switching disk 151.

The infrared imaging device 100 has a structure in which the standard heat board 162 of a high temperature side and the standard heat board 163 of a low temperature side are arranged in a circular direction of the view switching disk 151, between the varying high magnification lens 130 and the varying low magnification lens 152.

Because of this, during the process of the view switching, the standard heat board 162 of a high temperature side and the standard heat board 163 of a low temperature side pass through the optical axis 102 near the infrared detector 140. Therefore, it is possible to calculate the coefficient of the sensitivity correction during the process of view switching. That is, whenever the view is switched, a new coefficient sensitivity correction is calculated, and thereby the accuracy of the sensitivity correction of the infrared detect element 141 is improved. The infrared image having a higher quality is indicated on the indication part 270.

The infrared imaging device 100 has a structure in which the standard heat board 162 of a high temperature side is approximately 10 centigrade higher than the back ground average temperature by using the peltier device 164 and the standard heat board 163 of a low temperature side is approximately 10 centigrade lower than the back ground average temperature by using the peltier device 165.

Therefore, the standard heat board 162 of a high temperature side and the standard heat board 163 of a low temperature side have a difference of a temperature of only approximately 20 centigrade, which is smaller than the difference of the temperature in a case where the peltier device is not used. Therefore, it is possible to obtain a proper coefficient of the sensitivity correction by reflecting the sensitivity property to the infrared detect element.

Thus, an infrared image having a higher quality than the conventional device is indicated on the indication part 270.

The infrared imaging device 100 has a lock mechanism unit 200 by which the view switching disk 151 is locked.

Therefore, the varying high magnification lens 130 and the varying low magnification lens 152 are positioned at a place where the optical axis of the varying high magnification lens 130 and the varying low magnification lens 152 correspond to the optical axis of the infrared detector 140. The infrared imaging device 100 has high endurance for vibration and impact.

The lock mechanism unit 200 of the infrared imaging device 100 has a structure in which a force F by which the plunger 400 is pushed up is stronger than a driving force of the solenoid 205. Therefore, the solenoid 205 can be made small-sized.

The solenoid 205 is used for the lock mechanism unit 200 of the infrared imaging device 100. Therefore, it is possible to implement the view switching remotely.

The infrared imaging device 100 has a structure in which the balance weight 220 is provided on the view switching disk 151.

Therefore, the center of the gravity of the view switching disk 151 having the standard heat source unit 160, the varying high magnification lens 130, and the varying low magnification lens 152 is positioned at a center of the view switching disk 151. A torque by which the view switching disk 151 can be rotated is constant no matter how much the rotation angle of the view switching disk 151 is. Therefore, the view switching disk 151 can be rotated with a constant torque and the view switching action is implemented smoothly. In addition, the required output of the motor 182 is small.

The infrared imaging device 100 has a structure in which the circumferential edge part of the upper and lower surfaces of the view switching disk 151 moves between the guide rollers 192 and 193.

Therefore, when the view switching disk 151 is rotated, the generation of the deflection of the view switching disk 151 can be avoided. Hence, a slide of the optical axis of the lens against to the optical axis of the infrared detector 140 is not generated. Furthermore, the circumferential edge of the view switching disk 151 is supported, and thereby the infrared imaging device 100 has a high endurance for vibration and impact.

The present invention is not limited to these embodiments, but various variations and modifications may be made without departing from the scope of the present invention.

This patent application is based on Japanese priority patent application No. 2001-264705 filed on Aug. 31, 2001, the entire contents of which are hereby incorporated by reference.

What is claimed is:

1. An infrared imaging device, comprising:
   a board which is movable inside the infrared imaging device;
   plural kinds of magnification lenses; and
   plural kinds of infrared light radiation parts which radiate infrared lights having respective radiation temperatures,
   wherein the lenses and the infrared light radiation parts are situated on the board.

2. The infrared imaging device as claimed in claim 1, wherein the plural kinds of the infrared light radiation parts are situated between the respective magnification lenses on the board and along a movement direction of the board.

3. The infrared imaging device as claimed in claim 2, wherein the board has a disk shape and the magnification lenses and the infrared light radiation parts are arranged along an inner circumference of the board.

4. The infrared imaging device as claimed in claim 1, wherein each of the magnification lenses has a different magnification.

5. The infrared imaging device as claimed in claim 1, the infrared light radiation parts include a base part which is fixed to the board.

6. The infrared imaging device as claimed in claim 1, wherein the board has a disk shape.

7. The infrared imaging device as claimed in claim 6, wherein a center of a gravity of an integral unit comprising the board, the magnification lenses, and the infrared light radiation parts is positioned at a center of the board.

8. The infrared imaging device as claimed in claim 6, further comprising a lock mechanism, whereby the board is locked at a designated position.

9. The infrared imaging device as claimed in claim 6, further comprising a guide mechanism, and upper and lower surfaces of an edge part of a circumference of the board are placed between the guide mechanism.

10. The infrared imaging device as claimed in claim 1, wherein each of the infrared light radiation parts has a peltier device.

11. An infrared imaging device having an infrared detector, comprising:
    magnification lenses; and
    view switching means for switching from one of the magnification lenses to another magnification lens;
    sensitivity correction means for correcting a displacement of a sensitivity of the infrared detector,
    wherein the magnification lenses and the sensitivity correction means are situated on the view switching means.

12. The infrared imaging device as claimed in claim 11, wherein the sensitivity correction means comprises plural kinds of infrared light radiation parts which radiate infrared lights having respective radiation temperatures.

13. The infrared imaging device as claimed in claim 12, wherein the infrared light radiation parts are situated between the respective magnification lenses situated on the view switching means and along a movement direction of the view switching means.

14. The infrared imaging device as claimed in claim 12, further comprising a lock means for locking the view switching means at a designated position.

15. The infrared imaging device as claimed in claim 11, wherein the infrared light radiation parts include a base part which is fixed to the board.

* * * * *